US012793456B1

(12) United States Patent
Kapovski et al.

(10) Patent No.: US 12,793,456 B1
(45) Date of Patent: Nov. 10, 2026

(54) LARGE LANGUAGE MODEL APPROACH TO AUDITABLE FORM ANALYSIS

(71) Applicant: Black Ore Technologies Inc., Austin, TX (US)

(72) Inventors: Pavel Kapovski, Holon (IL); Eyal Shinar, Austin, TX (US)

(73) Assignee: Black Ore Technologies Inc., Austi, TX (US)

( * ) Notice: Subject to any disclaimer, the term of this patent is extended or adjusted under 35 U.S.C. 154(b) by 289 days.

(21) Appl. No.: 18/602,601

(22) Filed: Mar. 12, 2024

(51) Int. Cl.
*G06V 30/18* (2022.01)
*G06F 40/40* (2020.01)

(52) U.S. Cl.
CPC ........ *G06V 30/18086* (2022.01); *G06F 40/40* (2020.01)

(58) Field of Classification Search
USPC .......................................................... 382/199
See application file for complete search history.

(56) References Cited

U.S. PATENT DOCUMENTS

2016/0155202 A1* 6/2016 Huang ................. G06Q 40/123 382/176
2023/0050085 A1* 2/2023 Litkenhous ........... G06F 40/226
2025/0068845 A1* 2/2025 Patel ...................... G06V 30/10
2026/0011415 A1* 1/2026 Atchison ................ G06Q 40/08

* cited by examiner

*Primary Examiner* — Jacky X Zheng
(74) *Attorney, Agent, or Firm* — Fenwick & West LLP

(57) ABSTRACT

An application receives a selection of the form and inputs the form into an LLM, the LLM outputting a description of contents within the form. The application inputs the form into an Optical Character Recognition (OCR) model. And receives, for each block of text within the form, a transcription of text within the block and location information corresponding to the block. For each block of text within the form, the application determines a portion of the description of contents within the form that corresponds to the text within the block and stores a mapping between the block and the portion of the description of contents. The application generates a report based on the mapping, and displays a navigable version of the report where, responsive to receiving a selection of a given descriptor, the user interface provides a view of the form that shows data corresponding to the given descriptor.

16 Claims, 7 Drawing Sheets

400

```
"ocrStrings": {
  "P1X379Y944W121H9": {
    "text": "17 State income tax",
    "type": "FIELD_LABEL",
    "confidence": 0.9905391,
    "symbolConfidence": [
      0.98687315,
      0.9906462,
      1.0,
      0.9821379,
      0.9937132,
      0.99161166,
      0.99165887,
      0.9880579,
      1.0,
      0.9924434,
      0.9961985,
      0.9922344,
      0.9932262,
      0.9906392,
      0.9941547,
      1.0,
      0.99325705,
```

*FIG. 4*

LARGE LANGUAGE MODEL APPROACH TO AUDITABLE FORM ANALYSIS

TECHNICAL FIELD

Aspects of this disclosure generally relate to the field of artificial-intelligence and machine learning, and more particularly relate to auditable complex form analysis using artificial intelligence.

BACKGROUND

Analysis of a compilation of forms is typically a highly manual process. As an example, a certified public accountant (CPA) performing analysis of tax forms typically reviews forms having dependencies manually and adds annotations throughout the forms that attempt to add explainability. However, due to the complexity of dependencies and the success of auditability depending on the quality of annotation that is manually input, it is often difficult or impossible to verify the form analysis based on such manual entries.

Attempts to automate form analysis using machine learning are inaccurate and have problems of explainability. That is, while machine learning models can be trained to output an analysis of a form, the models are incapable of outputting information that explains how the analysis was formed, thereby rendering their outputs unreliable. Even with advances in the latest large language models such as GPT 4.0, these large language models are prone to errors in analyzing complex forms, such as tax forms having complex fields with multiple values encoded therein.

Classical machine learning approaches, such as traditional supervised machine learning, also are inadequate for form analysis. For example, tax forms are not consistent from year to year, as regulators change their content frequently. Therefore, using historical training examples to train a supervised model to read a form is also error prone in that the model may output inaccurate readings where a form has even slightly changed. Moreover, those errors will not be readily detectable given that the model output is also not explainable. Therefore, classical machine learning models are also not able to be reliably used for form analysis.

SUMMARY

Systems and methods are disclosed herein that apply artificial intelligence in connection with optical character recognition (OCR) technology to leverage efficiencies of machine learning while ensuring accuracy of form analysis and auditability and explainability of results. In some embodiments, a form analysis tool receives a selection of a form (e.g., as part of a selection of forms by a user). The form analysis tool inputs a representation of the form into a Large Language Model (LLM), and receives as output from the LLM a description of contents within the form. The form analysis tool also inputs the representation of the form into an Optical Character Recognition (OCR) model and receives, as output from the OCR model, for each block of text within the form, a transcription of text within the block and location information corresponding to the block.

For each block of text within the form, the form analysis tool determines a portion of the description of contents within the form that corresponds to the text within the block and stores a mapping between the block and the portion of the description of contents. The form analysis tool generates generating a report based on the mapping, the report having descriptors based on the description of contents within the form. The form analysis tool generates for display a user interface that displays a navigable version of the report where, responsive to receiving a selection of a given descriptor, the user interface provides a view of the form that shows data corresponding to the given descriptor.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates exemplary output of an OCR model, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
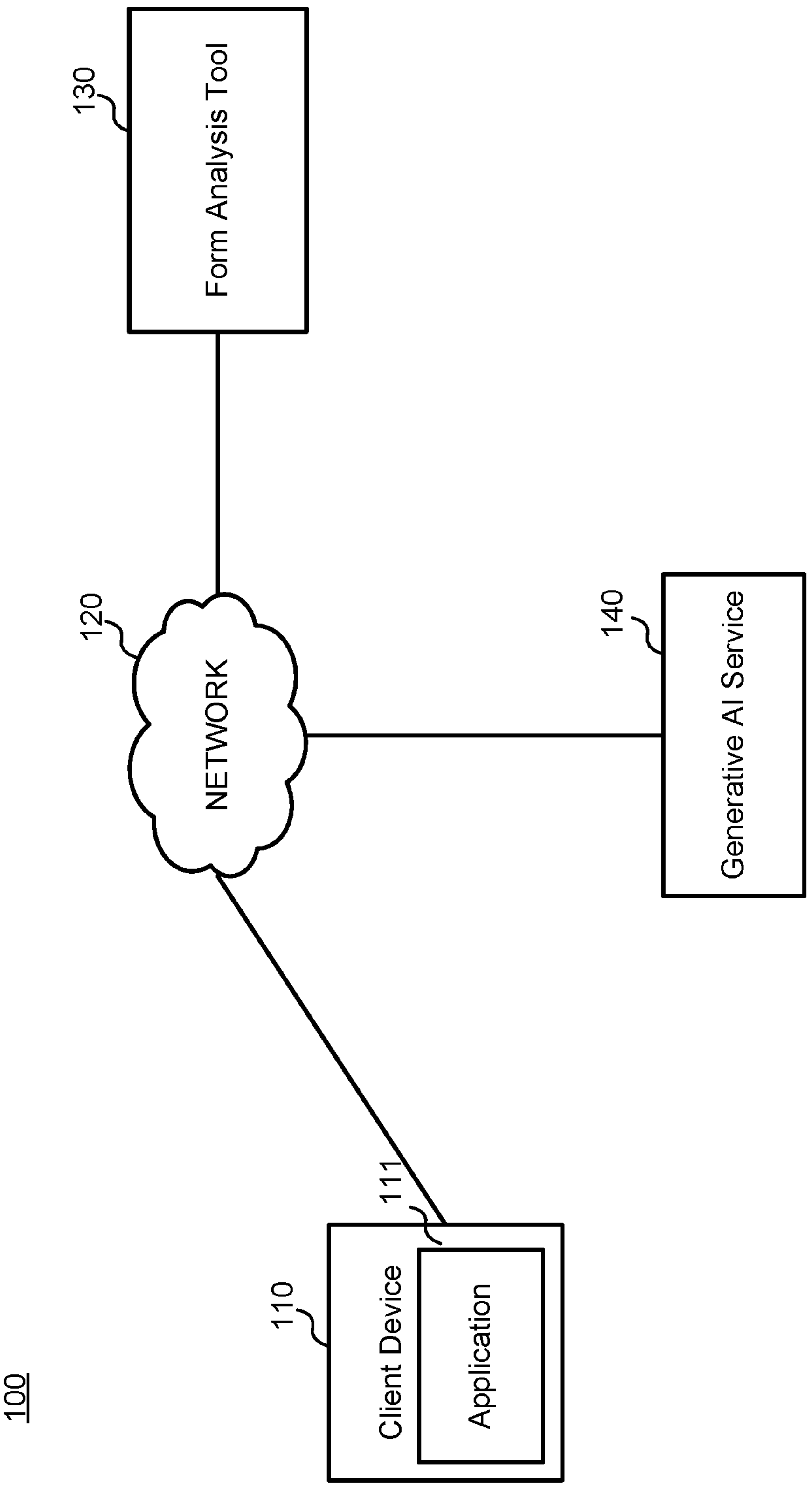
FIG. 1 illustrates one embodiment of a system environment for implementing a form analysis tool.

FIG. 1 illustrates one embodiment of a system environment for implementing a form analysis tool. As depicted in FIG. 1, environment 100 includes client device 110 with application 111 installed thereon, network 120, form analysis tool 130, and generative AI service 140. Client device 110 may be any device having a user interface useable to interact with form analysis tool 130 via notebook application 111. Exemplary client devices may include personal computers, laptops, tablets, smartphones, and so on. While only one client device 110 is depicted, any number of client devices may be used. Multiple client devices may be used at a same time to access and otherwise collaborate on a same notebook.

Application 111 may be a dedicated application installed on client device 110 for performing form analysis. Application 111 may be installed directly or indirectly from form analysis tool 130 (e.g., downloaded from form analysis tool 130; downloaded from an application store; from a hard drive having installation code, and so on). Any form analysis activities may in whole or in part be performed on client device 110 by application 111 or may be performed in the cloud (e.g., using notebook tool 130). Application 111 may be a browser through which form analysis functionality may be accessed from form analysis tool 130. Details on activities of client device 110 and application 111 are discussed in further detail with reference to FIGS. 2-7.

Network 120 may be a data communication channel between client device 110 and form analysis tool 130. The data communication channel may be any channel usable to transmit communications between these entities, such as the Internet, a local area network, a wireless network, a short-range communications network, and so on. Network 120 may facilitate communication between any number of client devices and external servers and services beyond those depicted in environment 100.

Form analysis tool 130 may be a cloud-based provider takes forms as an input and provides analysis and a navigable user interface as described herein. All functionality described herein with respect to application 111 may be performed by form analysis tool 130, and all functionality described herein with respect to form analysis tool 130 may be performed by application 111. Distributed processing where some activity described is performed by 111 and other activity described is performed by form analysis tool 130 is implied as within the scope of what is described even where processing is only described with respect to one of the two entities herein. Further details about the functionality of form analysis tool 130 are described below with respect to FIG. 2.

Generative AI service 140 provides access to a large language model (LLM) for generating responses to queries, such as natural language queries. Queries may include images of forms, where the LLM is primed with instructions to parse the forms and provide an analysis of contents of the forms. Generative AI service 140 may be a service external to form analysis tool 130 (as depicted), or may be integrated as part of notebook tool 130 (not depicted).

Figure 2:
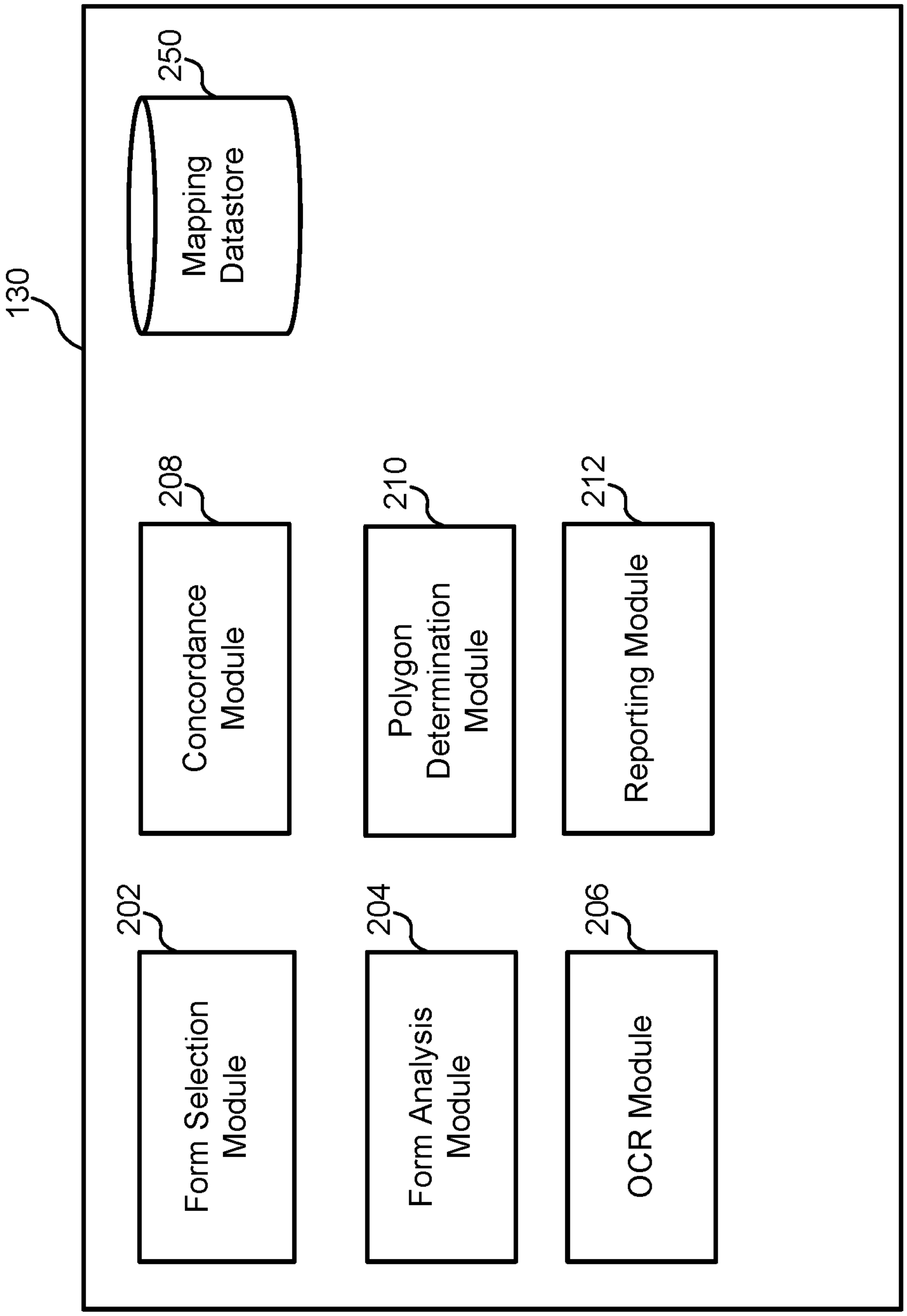
FIG. 2 illustrates one embodiment of modules and databases used by the form analysis tool.

FIG. 2 illustrates one embodiment of modules and databases used by the form analysis tool. As depicted in FIG. 2, form analysis tool 130 includes form selection module 202, form analysis module 204, OCR module 206, concordance module 208, polygon determination module 210, and reporting module 212, and also includes mapping datastore 250. The modules and databases shown in FIG. 2 are merely exemplary, and more or fewer modules and/or databases may be used to achieve the functionality disclosed herein.

Form selection module 202 receives a selection of one or more forms for analysis by form analysis tool 130. In some embodiments, the selection is received based on receiving input from a user of a set of forms for analysis. Form selection module 202 may receive the input in any known manner, including a drag-and-drop of files and/or folders having forms, a specification of a command line or universal resource locator (URL) of where forms may be located, and so on. Form selection module 202 may store copies of the selected forms to one or more databases of form analysis tool 130 and/or on client device 110, and/or may delete the selected forms following analysis. Form selection module 202 may select some forms for analysis using the modules depicted in FIG. 2 of form analysis tool 130, while using other analysis mechanisms for other forms. For example, form selection module 202 may identify a first set of forms that are rasterized and do not have a native text identification mechanism within them, such as scanned physical papers that are true images. Form selection module 202 may identify a second set of forms that have a native text identification mechanism, such as native PDFs, and may extract text without using an LLM by using the native mechanism, thereby saving on processing power by selectively using the LLM and OCR models referenced below only when necessary.

Form analysis module 204 inputs a representation of the form into a Large Language Model (LLM) (e.g., generative AI service 140). The representation of the form may be an image of the form, the form itself in its original format (e.g., a pdf format), one or more portions of the form, an encoded version of the form (e.g., already transformed into latent space), and so on. Form analysis module 204 may additionally prime the LLM with context. For example, prompts may be pre-set that explain to the LLM, "you have the skillset of an expert certified public accountant. Review these forms and explain their contents." In some embodiments, priming context provided to the LLM may be general and applied regardless of which form is submitted. In some embodiments, different and/or additional priming context may be provided depending on which form is submitted. For example, a mapping table may exist that maps form title (e.g., 1099-INT) to additional prompts to the LLM, such as "This is a 1099-INT form, please confine your analysis of examples to other 1099-INT forms".

Figure 3:
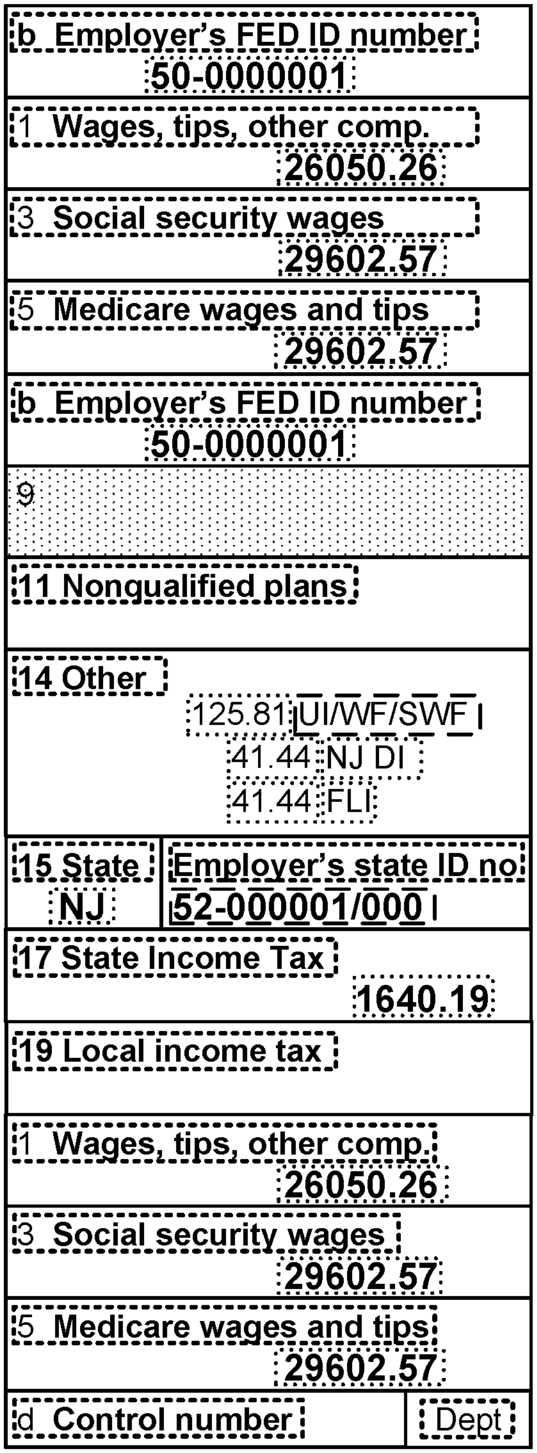
FIG. 3 illustrates an representation of a form processed by the form analysis tool, in accordance with an embodiment.

Form analysis module 204 receives as output from the LLM a description of contents within the form. Turning for the moment to FIG. 3, FIG. 3 illustrates a representation of a form processed by the form analysis tool, in accordance with an embodiment. Form 300 is a portion of a W-2 form and is merely exemplary; any other form may be used. The forms discussed herein are, for the purposes of illustration, tax forms; however, forms of any type (e.g., medical record forms) may be analyzed by form analysis tool 130. In an example where a representation of form 300 is input into the LLM, the LLM might output "This form indicates that the employer of EMPLOYEE has an FED ID number of 52-0222226. EMPLOYEE earned 26,050.26 in wages, tips, and other compensation. EMPLOYEE earned 29,602.57 in social security wages and in Medicare wages and tips . . . [and so on]. The LLM would likely incorrectly output the meaning of box 14 based on an overbroad diversity of examples in training data. A limitation of the LLM is it would not output location data that indicates the underlying data that supports its output.

Returning to FIG. 2, OCR module 206 inputs a representation of the form into an Optical Character Recognition (OCR) model. The representation may be a same or different representation that was input into the LLM. OCR module 206 receives, as output from the OCR model, for each block of text within the form, a transcription of text within the block and location information corresponding to the block. Returning for the moment to FIG. 3, a block may include any polygon (typically a rectangle) within the form. Text within the block in FIG. 3 includes a sequence marker (e.g., the number on the top left of the block), a description of the values within the block (e.g., "Social security wages"), and the value itself. The location information may be the sequence marker (e.g., sequence number or other sequential marker such as lettering) and/or any other location information, such as a coordinate or range of coordinates within the representation of the form where the OCR was performed (e.g., pixel coordinates on an x-y axis). While sequence markers are referred to throughout for location information, where sequence markers are referred to, any other coordinate may be used. The sequence markers, range of coordinates, or other location information may indicate which polygon within the form each block of text is within.

To further explain the activity of the OCR model, we briefly turn to FIG. 4. FIG. 4 illustrates exemplary output of an OCR model, in accordance with an embodiment. As shown in file 400, the OCR model has taken as input the text "17 State income tax" from file 300. Optionally, the OCR model may be programmed to label text of a certain type. For example, the OCR model may be programmed to recognize the first string of text it encounters as a "FIELD_LABEL" as indicated in file 400. The OCR model may, for each character, output a confidence that a given character within the representation of file 300 is accurately predicted. For example, from "17 State income tax", file 400 indicates a confidence of 0.98687315 that "1" is the first character, indicates a confidence of 0.9906462 that "7" is the second character, indicates a confidence of 1.0 that a space character is the third character, and so on. In an embodiment, OCR module 206 receives as output from the OCR model a predicted string. In an embodiment, OCR module 206 receives as output form the OCR model confidence for each character in the string, and applies a threshold (e.g., at least a confidence of 0.97) to determine whether to accept the string or characters therein. Where the threshold is not met for a given character, OCR module 206 may flag the text box for human review.

Again returning to FIG. 2, concordance module 208 determines values for different parameters indicated within the report by determining and mapping a concordance between the outputs of form analysis module 204 and OCR module 206. The concordance between the two modules' outputs is important to ensure accuracy of results and create an auditable trail of information. For example, by determining that the LLM's determination of social security number corresponds to a certain block within a form, a mapping may be generated where one can quickly navigate to that portion of the form by using the mapping to verify that the LLM's results are accurate, thereby contributing to explainability.

To determine the concordance, concordance module 208 determines, for each block of text within the form, a portion of the description of contents within the form that corresponds to the text within the block. There are two different approaches that might be taken by concordance module 208 depending on whether values within a block are unique relative to values of parameters in other blocks of the form. The easier path is where blocks are unique. Concordance module 208 may determine that a value within the description of contents within the form is unique by determining whether a string of text for a value of a parameter within a block of text as output by the OCR module is identical to a string of text in any other block of text. If there is no identical string of text in any other block, then the value is unique. For example, referring back to form 300, the value in "Wages, tips, other comp." of 26050.26 is unique, whereas the value of 29602.57 is not unique because it appears in both two blocks (the blocks with sequence numbers 3 and 5). In some embodiments, the requirement of "identical" is relaxed to account for errors in OCR, where at least a threshold number of characters may be different and the strings may still be considered identical by concordance module 208 (e.g., with a threshold of one, one character in the string may be identical).

Where a text block has a unique value as indicated by OCR module 206, concordance module 208 searches for the same value within the analysis output by form analysis module 204. Following again from the example from form 300, after determining that value 26050.26 is unique, concordance module 208 searches the analysis from the LLM for the same value of 26050.26 and determines that the LLM has indicated that this value corresponds to "Wages, tips, other comp." Accordingly, concordance module 208 determines that the OCR and LLM outputs correspond to one another, and responsively maps "wages, tips, other comp" to the location of the corresponding block in the form (e.g., by storing the sequence marker of "1", by storing pixels or a range of pixels that correspond to that block, etc.). This ultimately enables form analysis tool 130 to generate a report that shows this value for "wages, tips, other comp" where a user can request to see where the value came from, and where form analysis tool 130 may responsively use the mapping to navigate a user interface to show the corresponding portion of form 300. Concordance module 208 may store the mapping to mapping datastore 250.

For values determined via OCR that are not unique, concordance module 208 performs additional processing. In an embodiment, concordance module 208 determines adjacencies between strings output by OCR module 2026. For example, for the value 29602.57 in form 300, this value appears both in the "Social security wages" text block and the "Medicare wages and tips" text block and therefore these values are not unique to just one parameter. Concordance module 208 may take the adjacent strings "Wages, tips, other comp." and "29602.57" and use those together to form a query as to whether the output of form analysis module 204 describes a value of 29602.57 in relation to "Wages, tips, other comp.". In this case, responsive to determining that the LLM has indicated that the "Wages, tips, other comp." value is 29602.57, concordance module 208 may determine a concordance between the LLM's analysis and the output of the OCR model and may generate a corresponding mapping between the LLM's analysis, the value, and the location of the corresponding text block. However, responsive to determining that the LLM's analysis indicates a different value for "Wages, tips, other comp.", concordance module 208 may determine that there is no concordance, and may flag this parameter for human review before electing a value.

In an embodiment, for values determined via OCR that are not unique, concordance module 208 determines adjacencies by looking at consecutive strings output by the OCR model. In some embodiments this may fail (e.g., in form 300 box 15 which may have "employer's state ID no" immediately following "State"). Polygon determination module 210 may inform concordance module 208 of blocks of text output by the OCR model to be used for comparison with the output of the LLM. Polygon determination module 212 may, within each text block, draw a rectangle (or any other polygon, such as an oval) from the beginning to the end of each separate text string within the text block. That is, the rectangle begins at the top of a block and spans a string of text according to an algorithm. The algorithm may, for example, be to raw a rectangle from a sequence marker through a string of following text until either a threshold number of space characters are encountered (e.g., one space is encountered) or an edge of the block is encountered. So, for box 3 in form 300, a rectangle is drawn from sequence number 3 through "Social security wages." The algorithm may specify that this rectangle defines a location and a field type (e.g., parameter). Another rectangle or other polygon may be drawn around a next string of characters (or around a plurality of strings) within the text block according to another algorithm. This second algorithm may define the string or strings to be values corresponding to the field type, and may draw the polygon until a different condition is reached (e.g., until any space character is reached or any other special character is reached, or until an edge of the text block is reached). Concordance module 208 may then take the field type and value and search for that field type and value within the LLM's outputs, and where a match is found, may determine a concordance and generate a corresponding mapping for storage in mapping datastore 250.

As mentioned above, there may be times where concordance module 208 determines that there is no concordance between an output of an LLM and a value determined using the OCR model. Concordance module 208 may generate an alert for a user to input the value. The alert may be pushed to a user directly (e.g., using the user interface through which forms were selected for analysis), or may be included as embedded within a report (discussed below with respect to report generation module 212). In an embodiment, the prompt to input the value may ask for free text indicating the value. The prompt may also request the user to input a location of the form or of another form that supports the value, where concordance module 208 may add the location to mapping datastore 250. The prompt may include candidate options that the user may select as the value, the candidate options from values within the OCR and/or from the LLM analysis that were not found to have a concordance between the two. The prompt may enable the user to select candidate options which thereby causes the user to be navigated to a display of a corresponding portion of a form that shows from where the value was found by the OCR model.

Figure 5:
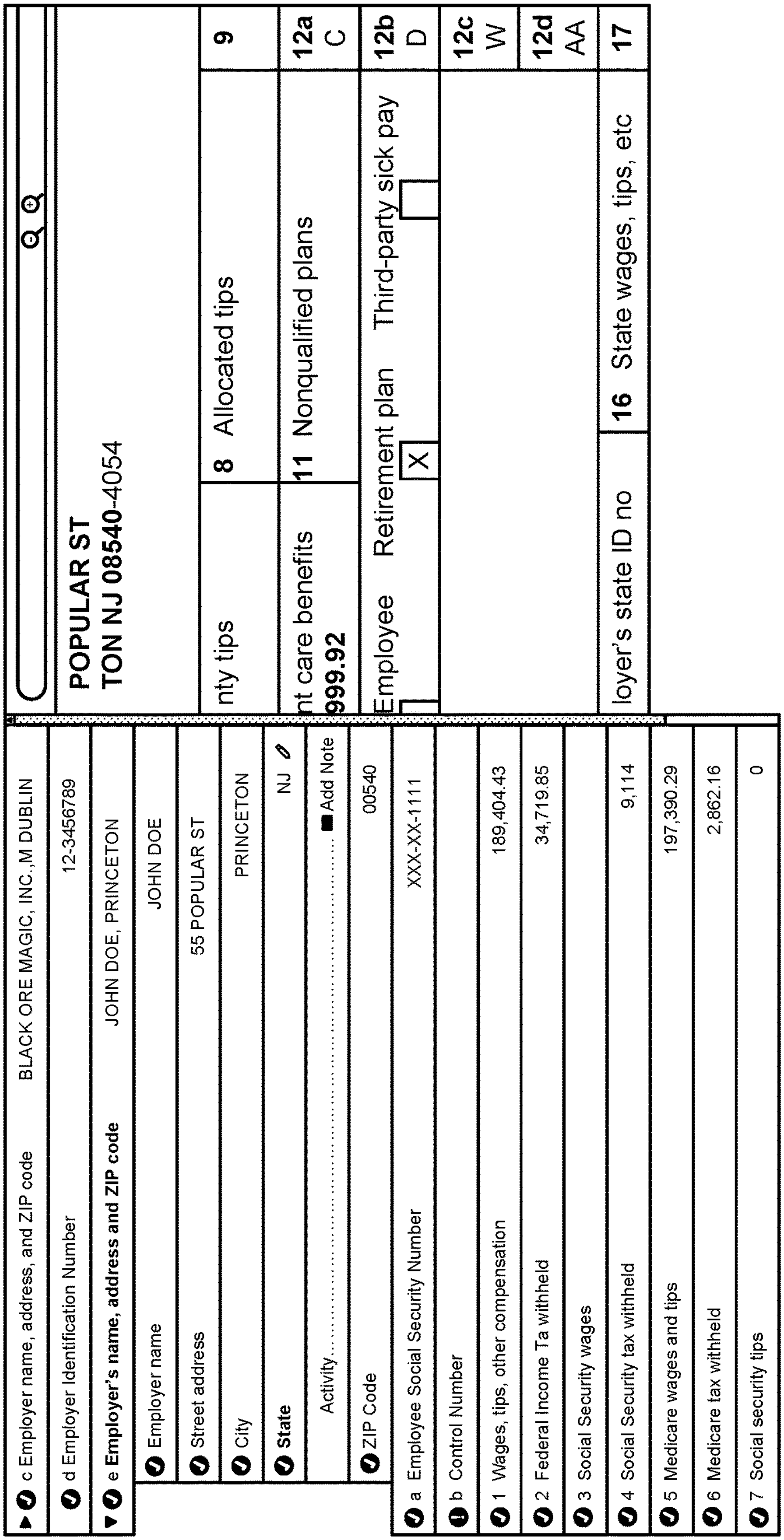
FIG. 5 illustrates an exemplary user interface for navigating a report generated by the form analysis tool, in accordance with an embodiment.

Reporting module 212 generates a report based on the mapping. The report may be a raw mapping (e.g., for a JSON output), and may be used for any purpose, such as enabling a navigable user interface. Turning briefly to FIG. 5, FIG. 5 illustrates an exemplary user interface for navigating a report generated by the form analysis tool, in accordance with an embodiment. As shown in user interface 500, the left pane includes a report of parameters and their corresponding values (e.g., the value of parameter "State" is NJ. The right pane of user interface 500 shows evidence of a given selected value. For example, responsive to reporting module 212 receiving a selection of the parameter "State," reporting module 212 navigates to a portion of form 300 showing an address with the state "NJ" depicted to prove the reported value. Parameters may be stated for any value on any input form, and reporting module 212 navigates to supporting portions of a form responsive to receiving a user selection of a given parameter. The two-pane user interface format shown in FIG. 5 is merely exemplary, and any form of navigation to produce evidence responsive to selection of a parameter is within the scope of this disclosure.

As shown in user interface 500, the parameter "Control Number" shows no value and shows an alert. A user may select the parameter "control number" and may input a value (e.g., along with location information) in any manner described in the foregoing with respect to concordance module 208. Following entry of the value, the "Control Number" parameter may show a value and may be selected, where reporting module 212 navigates to the supporting portions of a form.

Computing Machine Architecture

Figure 6:
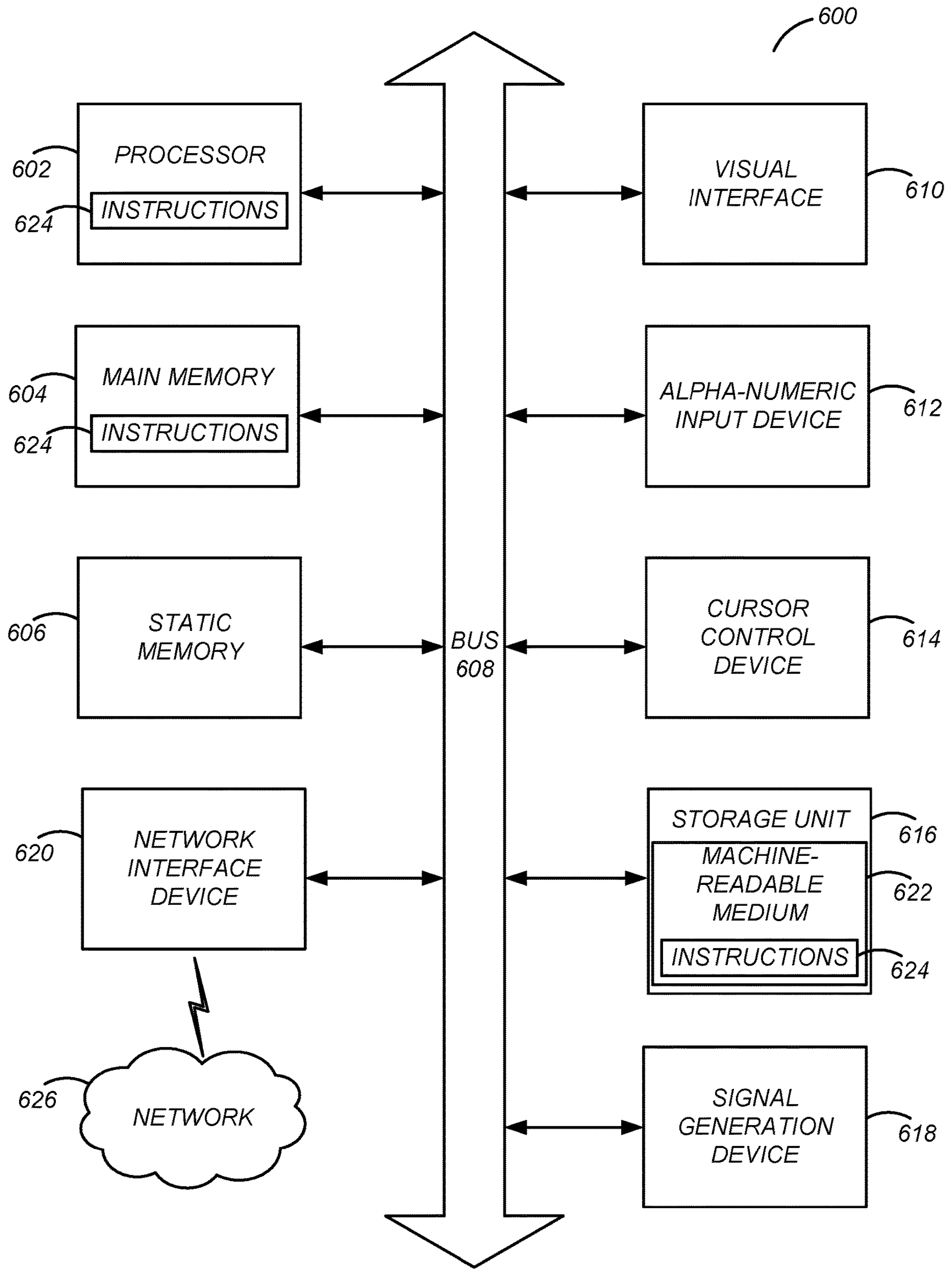
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Exemplary Processes

Figure 7:
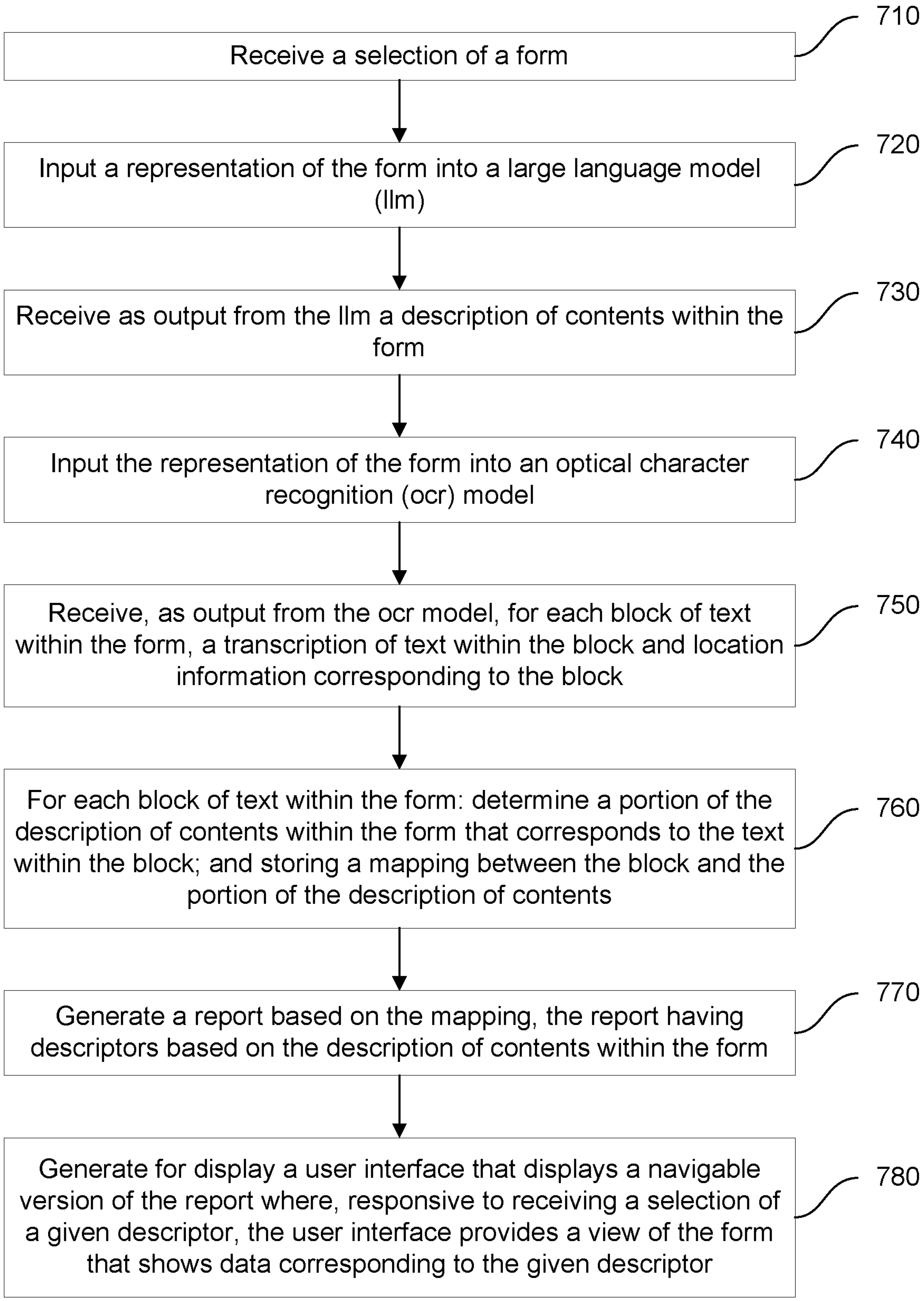
FIG. 7 is an exemplary flowchart illustrating a process for generating a report for navigation using a user interface based on form analysis of a form analysis tool, in accordance with an embodiment.

FIG. 7 is an exemplary flowchart illustrating a process for generating a report for navigation using a user interface based on form analysis of a form analysis tool, in accordance with an embodiment. Process 700 may be executed by modules (e.g., of FIG. 200) of form analysis tool 130 that are called based on one or more processors executing instructions to perform form analysis. Process 700 may begin with form analysis tool 130 receiving 710 a selection of a form (e.g., as part of a selection of a set of forms, as performed by form selection module 202). Form analysis tool 130 may input 720 a representation of the form into a Large Language Model (LLM) and receive 730 as output from the LLM a description of contents within the form (e.g., as performed by form analysis module 204). Form analysis tool 130 may input 740 the representation of the form into an Optical Character Recognition (OCR) model and may receive 750, as output from the OCR model, for each block of text within the form, a transcription of text within the block and location information corresponding to the block (e.g., as performed by OCR module 206).

Form analysis tool 130 may perform 760, for each block of text within the form and act of determining a portion of the description of contents within the form that corresponds to the text within the block and storing a mapping between the block and the portion of the description of contents (e.g., using concordance module 208, optionally in conjunction with activity of polygon determination module 210). Form analysis tool 130 may generate 770 a report based on the mapping, the report having descriptors based on the description of contents within the form (e.g., using reporting module 212). Form analysis tool 130 may generate for display a user interface that displays a navigable version of the report where, responsive to receiving a selection of a given descriptor, the user interface provides a view of the form that shows data corresponding to the given descriptor.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for performing form analysis through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

receiving a selection of a form;

inputting a representation of the form into a Large Language Model (LLM);

receiving as output from the LLM a description of contents within the form;

inputting the representation of the form into an Optical Character Recognition (OCR) model;

receiving, as output from the OCR model, for each block of text within the form, a transcription of text within the block and location information corresponding to the block, wherein the OCR model is configured to determine the location information by outputting an indication of which polygon within the form each block of text is within, wherein each block of text is marked with a different sequence number, and wherein the indication of which polygon within the form each block of text is within is a sequence number;

for each block of text within the form:

determining a portion of the description of contents within the form that corresponds to the text within the block; and storing a mapping between the block and the portion of the description of contents; and generating a report based on the mapping.

2. The method of claim 1, wherein the representation of the form is an image of the form.

3. The method of claim 1, further comprising determining that, for a given block of text, there is no corresponding portion of the description of contents within the form that corresponds to the text within the given block of text, wherein generating the report comprises generating an alert to have a user verify a value for the given block of text.

4. The method of claim 3, further comprising:

receiving an input of the value for the given block of text; and storing an updated mapping between the given block of text and the value.

5. The method of claim 4, wherein receiving the input of the value for the given block of text comprises receiving an input of a block identifier from which the value was derived, and wherein the method further comprises:

storing the block identifier in connection with the updated mapping; and responsive to receiving a selection of a descriptor corresponding to the given block of text, navigating a user interface to the given block of text based on the block identifier.

6. The method of claim 1, wherein determining a portion of the description of contents within the form that corresponds to the text within the block comprises:

determining that a value within the description of contents within the form is unique; and determining the portion of the description of contents within the form to correspond to a given block having the value.

7. The method of claim 1, wherein determining a portion of the description of contents within the form that corresponds to the text within the block comprises:

responsive to determining that a value within the description of contents within the form is not unique, identifying a given block based on a topic indicated as corresponding to the value within the description of contents;

comparing the value to a given value within the given block output by the OCR model; and responsive to determining a match from the comparison, determining that the portion of the description of contents within the form corresponds to the text within the given block.

8. The method of claim 1, wherein the report has descriptors based on the description of contents within the form, and wherein the method further comprises:

generating for display a user interface that displays a navigable version of the report where, responsive to receiving a selection of a given descriptor, the user interface provides a view of the form that shows data corresponding to the given descriptor.

9. A non-transitory computer-readable medium comprising memory with instructions encoded thereon that, when executed, cause one or more processors to perform operations, the instructions comprising instructions to:

receive a selection of a form;

input a representation of the form into a Large Language Model (LLM);

receive as output from the LLM a description of contents within the form;

input the representation of the form into an Optical Character Recognition (OCR) model;

receive, as output from the OCR model, for each block of text within the form, a transcription of text within the block and location information corresponding to the block, wherein the OCR model is configured to determine the location information by outputting an indication of which polygon within the form each block of text is within, wherein each block of text is marked with a different sequence number, and wherein the indication of which polygon within the form each block of text is within is a sequence number;

for each block of text within the form:

determine a portion of the description of contents within the form that corresponds to the text within the block; and store a mapping between the block and the portion of the description of contents;

generate a report based on the mapping.

10. The non-transitory computer-readable medium of claim 9, wherein the representation of the form is an image of the form.

11. The non-transitory computer-readable medium of claim 9, wherein the instructions further comprise instructions to determine that, for a given block of text, there is no corresponding portion of the description of contents within the form that corresponds to the text within the given block of text, wherein the instructions to generate the report comprise instructions to generate an alert to have a user verify a value for the given block of text.

12. The non-transitory computer-readable medium of claim 11, the instructions further comprising instructions to:

receive an input of the value for the given block of text; and store an updated mapping between the given block of text and the value.

13. The non-transitory computer-readable medium of claim 12, wherein receiving the input of the value for the given block of text comprises receiving an input of a block identifier from which the value was derived, and wherein the instructions further comprise instructions to:

store the block identifier in connection with the updated mapping; and responsive to receiving a selection of a descriptor corresponding to the given block of text, navigate a user interface to the given block of text based on the block identifier.

14. The non-transitory computer-readable medium of claim 9, wherein the instructions to determine a portion of the description of contents within the form that corresponds to the text within the block comprise instructions to:

determine that a value within the description of contents within the form is unique; and determine the portion of the description of contents within the form to correspond to a given block having the value.

15. The non-transitory computer-readable medium of claim 9, wherein the instructions to determine a portion of the description of contents within the form that corresponds to the text within the block comprise instructions to:

responsive to determining that a value within the description of contents within the form is not unique, identify a given block based on a topic indicated as corresponding to the value within the description of contents;

compare the value to a given value within the given block output by the OCR model; and responsive to determining a match from the comparison, determine that the portion of the description of contents within the form corresponds to the text within the given block.

16. A system comprising:

memory with instructions encoded thereon; and one or more processors that, when executing the instructions, are caused to perform operations comprising:

receiving a selection of a form;

inputting a representation of the form into a Large Language Model (LLM);

receiving as output from the LLM a description of contents within the form;

inputting the representation of the form into an Optical Character Recognition (OCR) model;

receiving, as output from the OCR model, for each block of text within the form, a transcription of text within the block and location information corresponding to the block, wherein the OCR model is configured to determine the location information by outputting an indication of which polygon within the form each block of text is within, wherein each block of text is marked with a different sequence number, and wherein the indication of which polygon within the form each block of text is within is a sequence number;

for each block of text within the form:

determining a portion of the description of contents within the form that corresponds to the text within the block; and storing a mapping between the block and the portion of the description of contents;

generating a report based on the mapping.

* * * * *